Dec. 27, 1938.　　　　　G. A. LYON　　　　2,141,718
BUMPER

Filed Nov. 5, 1936

Inventor
GEORGE ALBERT LYON

Patented Dec. 27, 1938

2,141,718

UNITED STATES PATENT OFFICE 2,141,718

BUMPER

George Albert Lyon, Allenhurst, N. J.

Application November 5, 1936, Serial No. 109,249

5 Claims. (Cl. 293—55)

This invention relates to vehicle bumpers and more particularly to vehicle bumpers of the type adapted to protect the radiator grille of an automotive vehicle.

Following the wide spread adoption of radiator grilles for automotive vehicles and particularly cast grilles, a new problem arose in the design and manufacture of vehicle bumpers. Cast grilles, for example, while highly pleasing to the eye are extremely brittle and hence are frequently broken by minor collisions. Other forms of grille although not easily broken are readily damaged by being bent out of their original shape. It therefore became desirable to provide a bumper so shaped as to afford a substantial degree of protection to the radiator grilles of automotive vehicles.

It is therefore an object of this invention to provide a novel vehicle bumper possessing the above highly desirable characteristics.

It is a further object of this invention to provide a novel vehicle bumper which is economical to manufacture and which is rugged and reliable in use.

It is a still further object of this invention to provide a vehicle bumper formed in a shape similar to the central portion of an inverted double cycloid.

Another object of this invention is to provide a novel vehicle bumper having a novel configuration.

The novel features which I believe to be characteristic of my invention are set forth with particularity in the appended claims. My invention, however, both as to its organization and manner of construction, together with further objects and advantages thereof, may best be understood by reference to the following description taken in connection with the accompanying drawing, in which:

Figure 1:
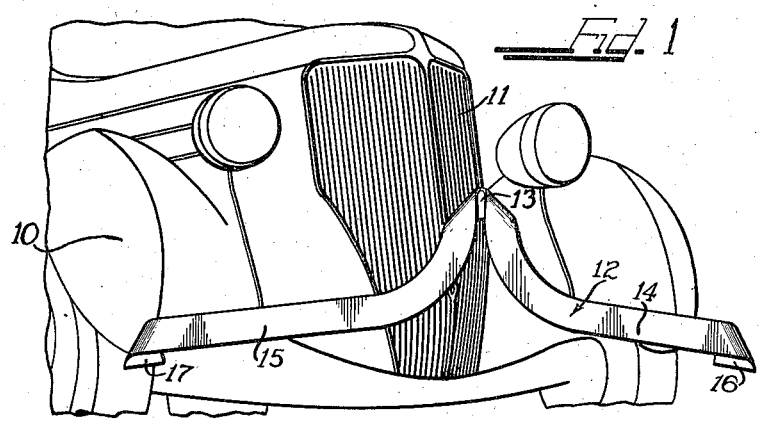
Figure 1 is a perspective view of the front portion of an automotive vehicle equipped with a vehicle bumper of the above referred to type.
Figure 2:
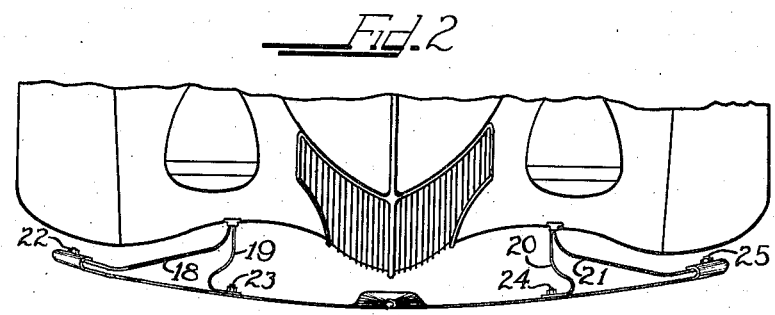
Figure 2 is a plan view of the front portion of the automotive vehicle and bumper illustrated in Figure 1.

Referring now to Figures 1 and 2 of the drawing, an automotive vehicle 10 having the usual radiator grille 11 is shown as equipped with a vehicle bumper 12 constructed in accordance with the teachings of the present invention.

Bumper 12 includes a central portion 13 and two oppositely extending arms 14 and 15 which terminate in downwardly extending end portions 16 and 17 respectively. The shape of bumper 12 in general is similar to the central portion of an inverted double cycloid. As will readily be understood from a cursory inspection of the drawing, central portion 13 of bumper 12 affords a substantial degree of protection to radiator grille 11.

Bumper 12 may be supported from the front of automotive vehicle 10 in any suitable manner. Such, for example, as by a plurality of supporting bars 18, 19, 20 and 21, the ends of which are secured to bumper 12 by means of bolts 22, 23, 24, and 25 respectively. As will be observed from Figure 2 of the drawing, supports 18 and 21 are connected to downwardly extending end portions 17 and 16 respectively of bumper 12 while arms 19 and 20 are connected to intermediate points on bumper 12.

Figure 3:
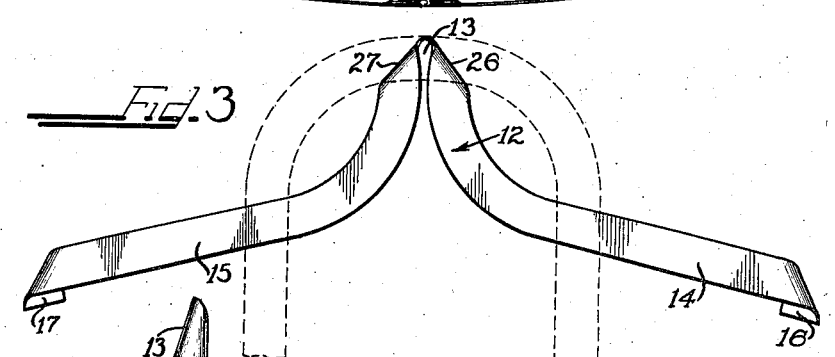
Figure 3 is a front elevational view of the vehicle bumper.
Figure 4:
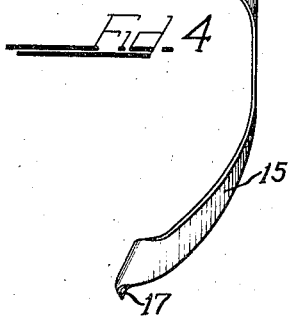
Figure 4 is an end view of the vehicle bumper.

The precise character of the bumper itself may be seen best in Figures 3 and 4 of the drawing. Bumper 12 includes a double fold in the central portion 13 as indicated at 26 and 27. Arms 14 and 15 extend downwardly, outwardly and rearwardly from the central portion 13 of bumper 12.

As will readily be appreciated by those skilled in the art, the upwardly extending central portion of bumper 12 provides a suitable means for protecting the radiator grille of an automotive vehicle. Inasmuch as the bumper may be formed from a single U-shaped strip of bumper material as indicated in the dotted line of Figure 3, it is obvious that the bumper is extremely economical to manufacture.

While I have shown a particular embodiment of my invention, it will of course be understood that I do not wish to be limited, since many modifications may be made and I therefore contemplate by the appended claims to cover all such modifications as fall within the true spirit and scope of my invention.

I claim as my invention:

1. As an article of manufacture, a vehicle bumper formed of a single strip of material having a central inverted V-shaped portion bent upwardly at an angle and turned back upon itself and two oppositely extending substantially horizontal arms leading away from said central portion.

2. As an article of manufacture, a vehicle bumper formed of a single strip of material having the central portion curved upwardly to form an inverted V-shaped apex, a portion of said strip at said apex being folded back upon said strip and bent downwardly to the rear of the plane of the major part of said strip to provide a reinforced impact section.

3. As an article of manufacture, a buffer for protecting a grille on an automobile formed from a substantially U-shaped single piece of flat metallic stock having spaced turned down ends and an intermediate upstanding central loop extending to a considerable height above the horizontal plane of its ends to protect the automobile grille from being impacted by external objects and being so formed and connected to said ends that impact forces tending to bend the same are transmitted to and resisted by said turned ends.

4. The combination of, a buffer for protecting a grille on an automobile formed from a substantially U-shaped single piece of flat metallic stock having spaced turned ends and an intermediate upstanding central loop extending to a considerable height above the horizontal plane of its ends to protect the automobile grille from being impacted by external objects and being so formed and connected to said ends that impact forces tending to bend the same are transmitted to and resisted by said turned ends, said intermediate upstanding loop having its uppermost portion turned back upon itself thus providing the buffer with a reinforced tip.

5. As an article of manufacture, a vehicle bumper formed of a single strip of material having spaced turned ends and an intermediate portion rising upwardly to an apex, a portion of said strip and said apex being bent back upon said strip and downwardly to the rear of the plane of the major part of said strip to provide a reenforced impact section, said bumper being so constructed and formed that impact forces tending to bend the same are transmitted to and resisted by said turned ends.

GEORGE ALBERT LYON.